(12) United States Patent
Lee et al.

(10) Patent No.: US 9,891,474 B2
(45) Date of Patent: Feb. 13, 2018

(54) FLEXIBLE LIQUID CRYSTAL PANEL AND MANUFACTURE METHOD THEREOF

(71) Applicant: Shenzhen China Star Optoelectronics Technology Co., Ltd., Shenzhen, Guangdong (CN)

(72) Inventors: Yungjui Lee, Guangdong (CN); Xinhui Zhong, Guangdong (CN)

(73) Assignee: Shenzhen China Star Optoelectronics Technology Co., Ltd., Shenzhen, Guangdong (CN)

(*) Notice: Subject to any disclaimer, the term of this patent is extended or adjusted under 35 U.S.C. 154(b) by 296 days.

(21) Appl. No.: 14/423,705

(22) PCT Filed: Feb. 9, 2015

(86) PCT No.: PCT/CN2015/072501
§ 371 (c)(1),
(2) Date: Feb. 24, 2015

(87) PCT Pub. No.: WO2016/082339
PCT Pub. Date: Jun. 2, 2016

(65) Prior Publication Data
US 2016/0341992 A1    Nov. 24, 2016

(30) Foreign Application Priority Data
Nov. 24, 2014 (CN) .......................... 2014 1 0683142

(51) Int. Cl.
*G02F 1/1339* (2006.01)
*G02F 1/1333* (2006.01)
(Continued)

(52) U.S. Cl.
CPC .......... *G02F 1/1339* (2013.01); *G02F 1/1341* (2013.01); *G02F 1/1368* (2013.01);
(Continued)

(58) Field of Classification Search
CPC ............ G02F 1/1339; G02F 1/133305; G02F 1/133514; G02F 1/133516;
(Continued)

(56) References Cited

U.S. PATENT DOCUMENTS

| 5,627,665 A | * | 5/1997 | Yamada | ............ G02F 1/133377 349/156 |
| 2006/0103784 A1 | * | 5/2006 | Liu | ...................... G02F 1/13394 349/106 |

(Continued)

FOREIGN PATENT DOCUMENTS

CN    1837905 A    9/2006

*Primary Examiner* — James Dudek
(74) *Attorney, Agent, or Firm* — Andrew C. Cheng (57) ABSTRACT

The present invention provides a flexible liquid crystal panel and a manufacture method thereof. The flexible liquid crystal panel comprises a first, a second flexible substrates (1, 3) oppositely located, a first, a second flat layers (11, 31) respectively located at an inner sides of the first, the second flexible substrates (1, 3), a color filter layer (33) located between the second flexible substrate (3) and the second flat layer (31), a spacing retaining wall (5) located on the second flat layer (31), seal glue (7) coated on a side of the spacing retaining wall (5) close to the first flexible substrate (1) and a liquid crystal layer (9); the spacing retaining wall (5) comprises a plurality of transverse parts (51) parallel with one another extending transversely and a plurality of longitudinal parts (53) parallel with one another extending longitudinally, and the transverse parts (51) and the longitudinal parts (53) interlace with one another to separate a plurality of sub pixels, and the liquid crystal layer (9) is filled in closed districts formed by the transverse parts (51) and the longitudinal parts (53) interlacing with one another.

4 Claims, 9 Drawing Sheets

(51) Int. Cl.
  *G02F 1/1335* (2006.01)
  *G02F 1/1341* (2006.01)
  *G02F 1/1343* (2006.01)
  *G02F 1/1362* (2006.01)
  *G02F 1/1368* (2006.01)

(52) U.S. Cl.
  CPC ...... *G02F 1/13394* (2013.01); *G02F 1/13439* (2013.01); *G02F 1/133305* (2013.01); *G02F 1/133514* (2013.01); *G02F 1/133516* (2013.01); *G02F 1/133528* (2013.01); *G02F 1/136286* (2013.01); *G02F 2001/136295* (2013.01); *G02F 2201/123* (2013.01); *G02F 2202/28* (2013.01)

(58) Field of Classification Search
  CPC ............. G02F 1/133528; G02F 1/1341; G02F 1/13539; G02F 1/136286; G02F 1/1368
  See application file for complete search history.

(56) References Cited

U.S. PATENT DOCUMENTS

2007/0091062 A1* 4/2007 French .............. G02F 1/133305
 345/107
2015/0349288 A1* 12/2015 Luo .................... H01L 51/5237
 257/99

* cited by examiner

FLEXIBLE LIQUID CRYSTAL PANEL AND MANUFACTURE METHOD THEREOF

FIELD OF THE INVENTION

The present invention relates to a display technology field, and more particularly to a flexible liquid crystal panel and a manufacture method thereof.

BACKGROUND OF THE INVENTION

With the gradual population of wearable application equipments, such as smart glasses, smart phone, et cetera, the demands to flexible display in the display industry have constantly increased.

An Organic Light Emitting Diodes Display (OLED) possesses properties of self-illumination, no required back light, being ultra thin, wide view angle, fast response and etc., and accordingly has the nature advantage of flexible display. However, the OLED industry remains the extremely high bar of technology. The difficulty of the manufacture process is high. The yield is low and the cost, the selling prices are high. These drawbacks get in way of wide applications of the OLED.

The Liquid Crystal Display (LCD) is the most widely used display product in the present market. The production technology is quite mature. The yield of the production is high. The cost is relatively low and the acceptance is high in the market.

Normally, the liquid crystal display comprises a shell, a liquid crystal display panel located in the shell and a backlight module located in the shell. The liquid crystal panel comprises a Color Filter (CF), a Thin Film Transistor Array Substrate (TFT Array Substrate) and a Liquid Crystal Layer filled between the two substrates. Transparent electrodes are formed at the inner side of the CF substrate and the TFT substrate. The liquid crystal display performs control to the orientation of the liquid crystal molecules in the liquid crystal layer with an electric field to change the polarization state of the light. The objective of display is achieved with the polarizer to realize the transmission and the obstruction of the optical path.

Figure 1:
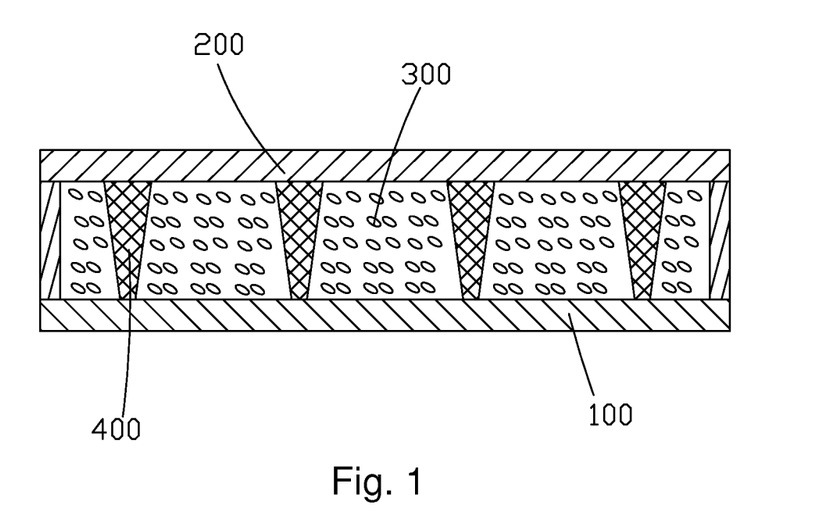
FIG. 1 is a structural diagram of a liquid crystal panel according to prior art in plane state.
Figure 3:
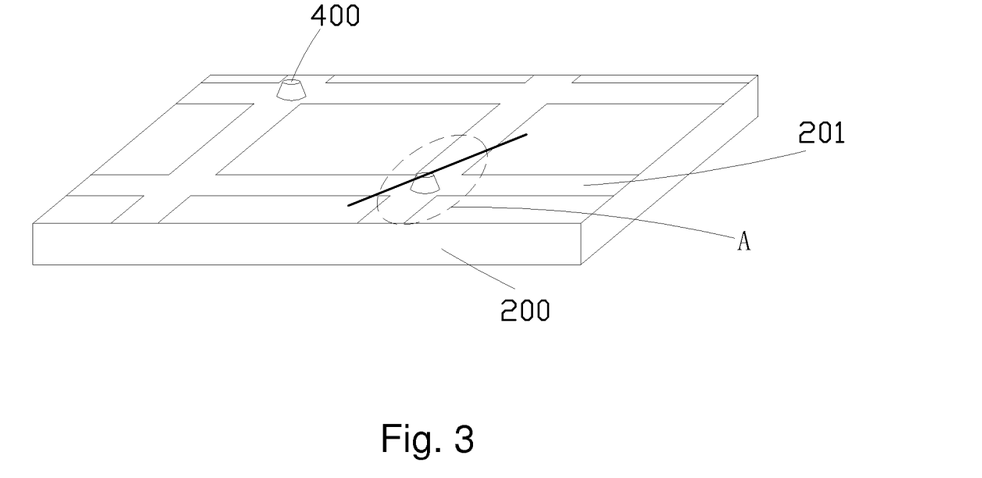
FIG. 3 is a stereo diagram of photo spacers in the liquid crystal panel according to prior art.
Figure 4:
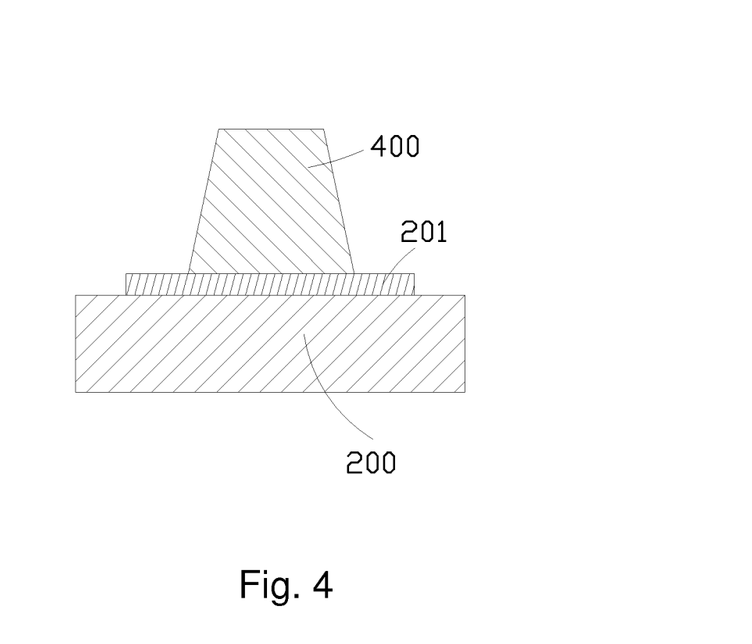
FIG. 4 is a sectional diagram corresponding to A section in FIG. 3.

At present, most of LCD productions, and particularly the large scale LCDs utilize Photo Spacer (PS) to control the Cell Gap. FIG. 1 is a structural diagram of a liquid crystal panel according to prior art in plane state. The liquid crystal material in the liquid crystal layer 300 is fluid which is flowable. The TFT substrate 100 and the CF substrate 200 are supported by the Photo Spacers 400 between the two substrates. As shown in FIG. 3, FIG. 4, the Photo Spacers 400 are generally formed with the photolithographic process in specific area in the display side, which is commonly in a Black Matrix (BM) 201 for maintaining the thickness and the stability of the liquid crystal layer 300.

Figure 2:
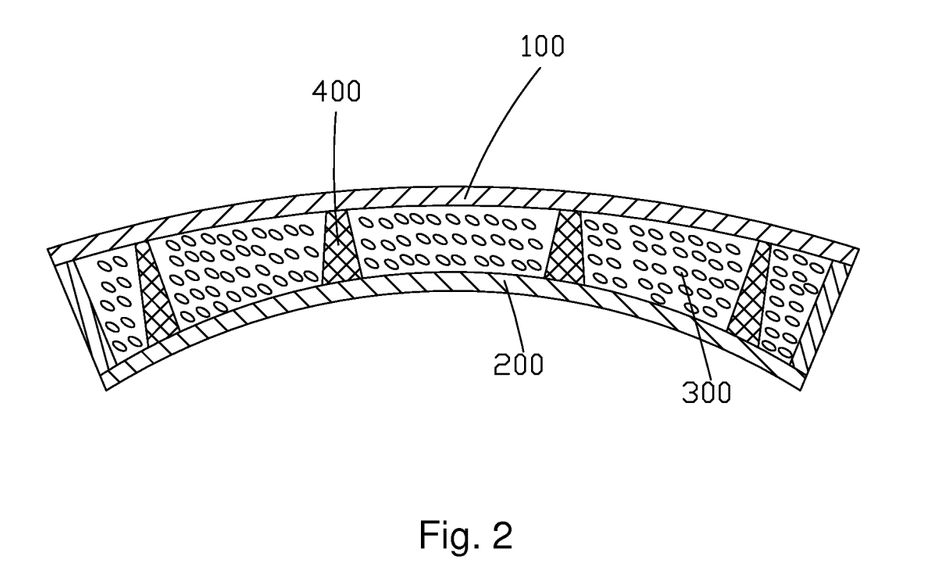
FIG. 2 is a structural diagram of a liquid crystal panel according to prior art in curved state.

Such Photo Spacers 400 cannot stop the liquid crystal material to flow in the entire liquid crystal panel. Although, the liquid crystal panel shown in FIG. 1 can satisfy the display evenness demands when the present liquid crystal panel in a plane state. The Cell Gap of the liquid crystal layer 300 is kept around the design value, and the Cell Gap is more even. However, after the liquid crystal panel previously in the plane state is bent, as shown in FIG. 2, the TFT substrate 100 and the CF substrate 200 are misaligned, and the curvature is not matched. The liquid crystal material is pressed and flowing. Ultimately, it results in that the uneven Cell Gap at various position of the liquid crystal layer. The thickness of the liquid crystal layer 300 is uneven to result in abnormal display.

The common liquid crystal panels in the main market can be categorized in three types, which respectively are Twisted Nematic/Super Twisted Nematic (TN/STN) types, In-Plane Switch (IPS) type and Vertical Alignment (VA) type. Although the principles of liquid crystal display adjustment have some differences. The basic structures of these three type liquid crystal panels are more similar. The display property and the Cell Gap of the liquid crystal layer are closely related. Whether the Cell Gap of the liquid crystal layer is even has the direct influence on the display effect. Changing the Cell Gap of the liquid crystal layer will affect the display brightness, contrast, response speed, etc. of the liquid crystal panel. Therefore, improvement is necessary to the present liquid crystal panel to solve the issue of uneven Cell Gap caused by the bent liquid crystal layer for allowing the liquid crystal panel adaptable for flexible display.

SUMMARY OF THE INVENTION

An objective of the present invention is to provide a flexible liquid crystal panel for stably supporting the cell gap between the two substrates, and firmly blocking the flow of the liquid crystals in the panel, and the evenness of the cell gap in a liquid crystal layer of a bent liquid crystal panel can be well maintained for being adaptable for flexible display.

Another objective of the present invention is to provide a manufacture method of a flexible liquid crystal panel to eliminate the issue of the uneven cell gap in a liquid crystal layer of a bent liquid crystal panel according to prior art to allow the liquid crystal panel adaptable for flexible display.

For realizing the aforesaid objective, the present invention provides a flexible liquid crystal panel, comprising a first flexible substrate and a second flexible substrate oppositely located with the first flexible substrate, a first flat layer located at an inner side of the first flexible substrate, a second flat layer located at an inner side of the second flexible substrate, a color filter layer located between the second flexible substrate and the second flat layer, a spacing retaining wall located on the second flat layer, seal glue coated on a side of the spacing retaining wall close to the first flexible substrate and employed for adhering the first flat layer and a liquid crystal layer filled between the first flat layer and the second flat layer;

the spacing retaining wall comprises a plurality of transverse parts parallel with one another extending transversely and a plurality of longitudinal parts parallel with one another extending longitudinally, and the transverse parts and the longitudinal parts interlace with one another to separate a plurality of sub pixels, and the liquid crystal layer is filled in closed districts formed by the transverse parts and the longitudinal parts interlacing with one another.

Both the first flexible substrate and the second flexible substrate are plastic substrates.

the seal glue is UV curing and heat curing complex glue, and is cured by a complex way of UV curing and heat curing;

the compositions of the seal glue are prepolymer resin, viscosity modifier, photoinitiator, heat curing agent and filler;

a ratio of total weight of the prepolymer resin is 10%-60%, and the prepolymer resin comprises one or many of prepolymer resins having polymerizable group, wherein the at least one prepolymer resin comprises acrylate group of UV curing and epoxy group of heat curing;

a ratio of total weight of the viscosity modifier is 5%-30%, and the viscosity modifier is reactive monomer having polymerizable group which the molecular weight is smaller and the viscosity is lower;

a ratio of total weight of the photoinitiator is 0.05%-1%, and the photoinitiator is a CIBA IRGACURE series of photoinitiator;

a ratio of total weight of the heat curing agent is 10%-40%, and the heat curing agent is a compound of Anhydride series or Amine series;

a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

The flexible liquid crystal panel further comprises a lower polarizer adhered at an outer side of the first flexible substrate, and an upper polarizer adhered at an outer side of the second flexible substrate.

The flexible liquid crystal panel further comprises gate lines, data lines, TFTs and ITO pixel electrodes located at the inner side of the first flexible substrate; an ITO common electrode located at the inner side of the second flexible substrate.

The spacing retaining wall is manufactured by photo process; the seal glue is coated by transfer printing; the liquid crystals of the liquid crystal layer are injected by spraying.

The present invention further provides a manufacture method of a liquid crystal display panel structure, comprising steps of:

step 1, providing a first flexible substrate and a second flexible substrate, and respectively adhering the first, the second flexible substrates with a first, a second glass substrates;

step 2, manufacturing gate lines, data lines, TFTs and ITO pixel electrodes at an inner side of the first flexible substrate, and deposing a first flat layer;

manufacturing a color filter layer and an ITO common electrode at an inner side of the second flexible substrate, and deposing a second flat layer;

step 3, manufacturing a spacing retaining wall on a second flat layer at a side of the second flexible substrate;

the spacing retaining wall comprises a plurality of transverse parts parallel with one another extending transversely and a plurality of longitudinal parts parallel with one another extending longitudinally, and the transverse parts and the longitudinal parts interlace with one another to separate a plurality of sub pixels;

step 4, coating seal glue at a side of the spacing retaining wall away from the second flexible substrate;

step 5, filling liquid crystals in closed districts formed by the transverse parts and the longitudinal parts of the spacing retaining wall interlacing with one another to form a liquid crystal layer;

step 6, oppositely vacuum laminating the first flexible substrate and the second flexible substrate;

step 7, curing the seal glue in a double way of UV irradiation and heating;

step 8, stripping the fist, the second glass substrates.

The manufacture method of the flexible liquid crystal panel further comprises a step 9, respectively adhering a lower polarizer and an upper polarizer at outer sides of the first flexible substrate and the second flexible substrate.

Both the first flexible substrate and the second flexible substrate are plastic substrates.

The spacing retaining wall is manufactured by photo process; the seal glue is coated by transfer printing; the liquid crystals are injected to form the liquid crystal layer by spraying;

the seal glue is UV curing and heat curing complex glue, and is cured by a complex way of UV curing and heat curing;

the compositions of the seal glue are prepolymer resin, viscosity modifier, photoinitiator, heat curing agent and filler;

a ratio of total weight of the prepolymer resin is 10%-60%, and the prepolymer resin comprises one or many of prepolymer resins having polymerizable group, wherein the at least one prepolymer resin comprises acrylate group of UV curing and epoxy group of heat curing;

a ratio of total weight of the viscosity modifier is 5%-30%, and the viscosity modifier is reactive monomer having polymerizable group which the molecular weight is smaller and the viscosity is lower;

a ratio of total weight of the photoinitiator is 0.05%-1%, and the photoinitiator is a CIBA IRGACURE series of photoinitiator;

a ratio of total weight of the heat curing agent is 10%-40%, and the heat curing agent is a compound of Anhydride series or Amine series;

a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

The present invention further provides a manufacture method of a liquid crystal display panel structure, comprising steps of:

step 1, providing a first flexible substrate and a second flexible substrate, and respectively adhering the first, the second flexible substrates with a first, a second glass substrates;

step 2, manufacturing gate lines, data lines, TFTs and ITO pixel electrodes at an inner side of the first flexible substrate, and deposing a first flat layer;

manufacturing a color filter layer and an ITO common electrode at an inner side of the second flexible substrate, and deposing a second flat layer;

step 3, manufacturing a spacing retaining wall on a second flat layer at a side of the second flexible substrate;

the spacing retaining wall comprises a plurality of transverse parts parallel with one another extending transversely and a plurality of longitudinal parts parallel with one another extending longitudinally, and the transverse parts and the longitudinal parts interlace with one another to separate a plurality of sub pixels;

step 4, coating seal glue at a side of the spacing retaining wall away from the second flexible substrate;

step 5, filling liquid crystals in closed districts formed by the transverse parts and the longitudinal parts of the spacing retaining wall interlacing with one another to form a liquid crystal layer;

step 6, oppositely vacuum laminating the first flexible substrate and the second flexible substrate;

step 7, curing the seal glue in a double way of UV irradiation and heating;

step 8, stripping the fist, the second glass substrates;

wherein the manufacture method of the flexible liquid crystal panel further comprises a step 9, respectively adhering a lower polarizer and an upper polarizer at outer sides of the first flexible substrate and the second flexible substrate;

wherein both the first flexible substrate and the second flexible substrate are plastic substrates.

The benefits of the present invention are: in the flexible liquid crystal panel of the present invention, by locating the spacing retaining wall at a side of the second flexible substrate, and coating the seal glue at a side of the spacing retaining wall close to the first flexible substrate to bond the first and the second flexible substrates together for stably supporting the cell gap between the two substrates, and firmly blocking the flow of the liquid crystals in the panel, the evenness of the cell gap in a liquid crystal layer of a bent liquid crystal panel can be well maintained for being adaptable for flexible display. In the manufacture method of the flexible liquid crystal panel according to the present invention, the spacing retaining wall is manufactured by photo process and the seal glue is coated at a side of the spacing retaining wall away from the second flexible substrate by transfer printing. Thus, the issue of the uneven cell gap in a liquid crystal layer of a bent liquid crystal panel according to prior art is eliminated to allow the liquid crystal panel adaptable for flexible display.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 5:
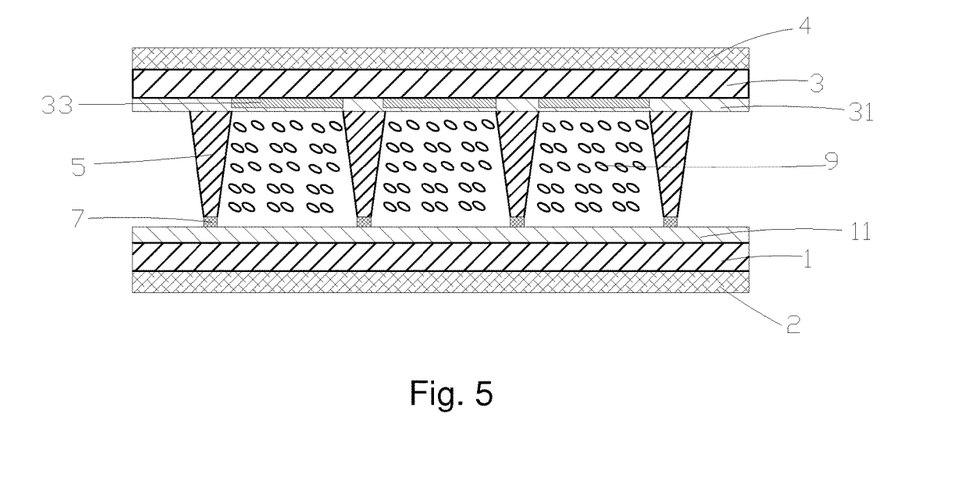
FIG. 5 is a sectional structure diagram of the flexible liquid crystal panel according to the present invention.
Figure 6:
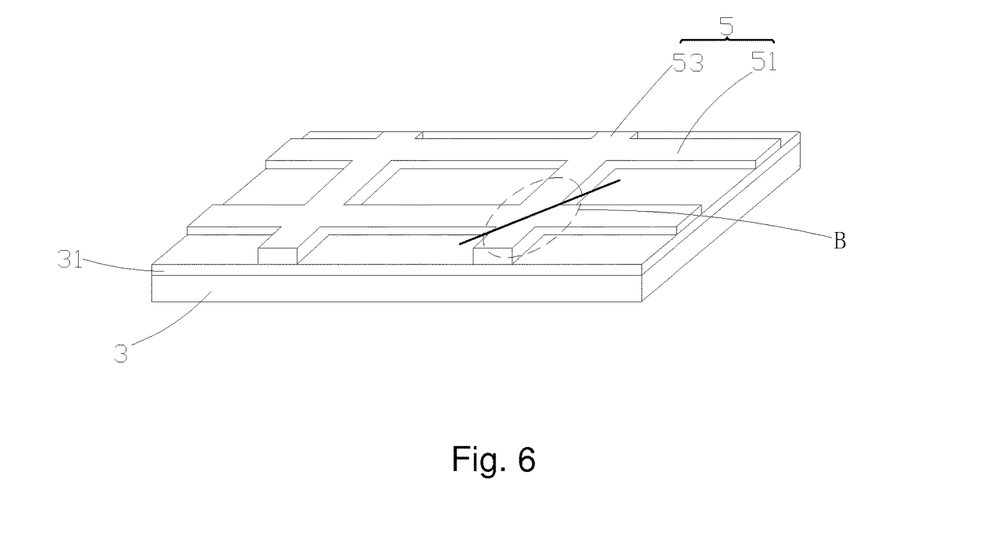
FIG. 6 is a stereo diagram of the spacing retaining wall in the liquid crystal panel according to the present invention.
Figure 7:
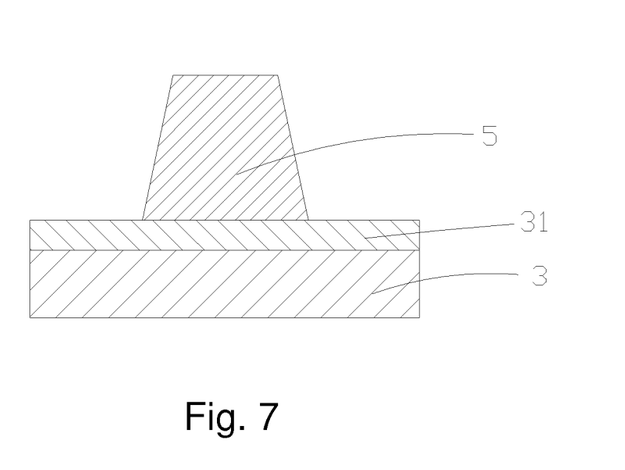
FIG. 7 is a sectional diagram corresponding to B section in FIG. 6.

Please refer from FIG. 5 to FIG. 7 together, the present invention first provides a liquid crystal display panel structure. The flexible liquid crystal panel comprises a first flexible substrate 1 and a second flexible substrate 3 oppositely located with the first flexible substrate 1, a first flat layer 11 located at an inner side of the first flexible substrate 1, a second flat layer 31 located at an inner side of the second flexible substrate 3, a color filter layer 33 located between the second flexible substrate 3 and the second flat layer 31, a spacing retaining wall 5 located on the second flat layer 31, seal glue 7 coated on a side of the retaining wall 5 close to the first flexible substrate 1 and employed for adhering the first flat layer 11 and a liquid crystal layer 9 filled between the first flat layer 11 and the second flat layer 31, and further comprises a lower polarizer 2 adhered at an outer side of the first flexible substrate 1, and an upper polarizer 4 adhered at an outer side of the second flexible substrate 3.

The spacing retaining wall 5 comprises a plurality of transverse parts 51 parallel with one another extending transversely and a plurality of longitudinal parts 53 parallel with one another extending longitudinally, and the transverse parts 51 and the longitudinal parts 53 interlace with one another to separate a plurality of sub pixels. The liquid crystal layer 9 is filled in closed districts formed by the transverse parts 51 and the longitudinal parts 53 interlacing with one another.

The spacing retaining wall 5 is manufactured by photo process; the seal glue 7 is coated by transfer printing; the liquid crystals of the liquid crystal layer 9 are injected by spraying.

Both the first flexible substrate 1 and the second flexible substrate 3 are transparent and flexible. Specifically, both the first flexible substrate 1 and the second flexible substrate 3 are plastic substrates, and preferably, the first flexible substrate 1 and the second flexible substrate 3 are polyimide (PI) substrates or polyethylene glycol terephthalate (PET) substrates.

Specifically, the seal glue 7 is UV curing and heat curing complex glue, and is cured by a complex way of UV curing and heat curing. The compositions of the seal glue 7 are prepolymer resin, viscosity modifier, photoinitiator, heat curing agent and filler.

Specifically, a ratio of total weight of the prepolymer resin is 10%-60%, and the prepolymer resin comprises one or many of prepolymer resins having polymerizable group (such as: acrylate group, methacrylate group, epoxy group), wherein the at least one prepolymer resin comprises acrylate group of UV curing and epoxy group of heat curing. It can be but not restricted to be:

n is an integer of 0-10.

A ratio of total weight of the viscosity modifier is 5%-30%, and the viscosity modifier is reactive monomer having polymerizable group which the molecular weight is smaller and the viscosity is lower. It can be but not restricted to be:

A ratio of total weight of the photoinitiator is 0.05%-1%, and the photoinitiator can be a CIBA IRGACURE series of photoinitiator, such as CIBA IRGACURE651, and the structure is below:

A ratio of total weight of the heat curing agent is 10%-40%, and the heat curing agent is a compound of Anhydride series or Amine series. It can be but not restricted to be:

A ratio of total weight of the filler is 5%-20%, and the filler is inorganic granular substance selected from silicon dioxide, aluminum oxide, zinc oxide, titanium oxide, magnesium oxide, calcium sulfate, aluminum nitride or silicon nitride.

Figure 8:
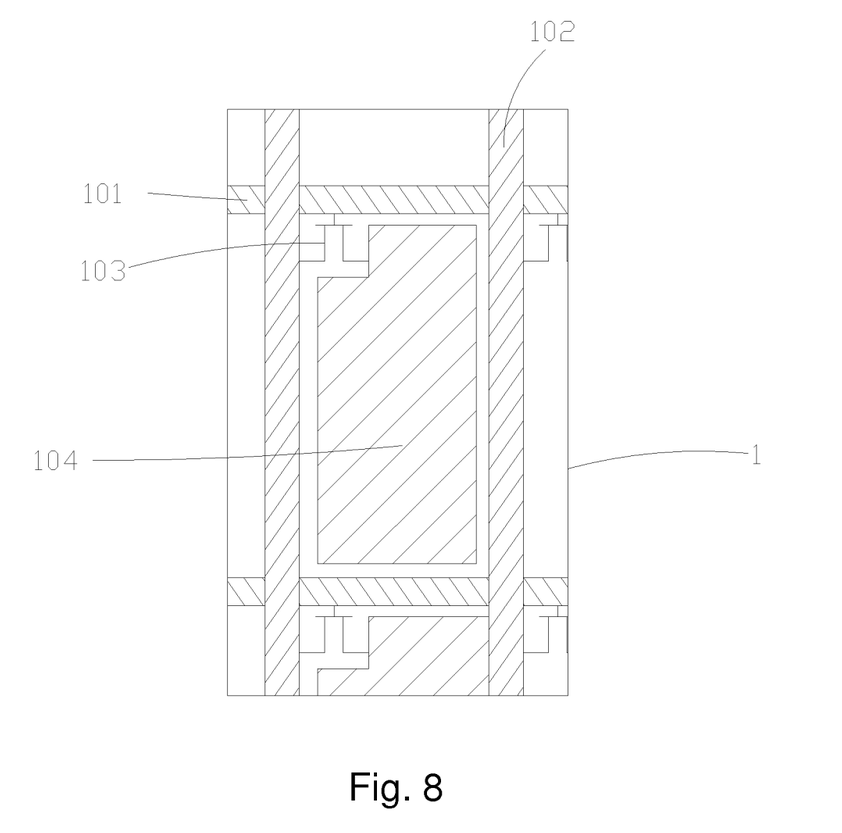
FIG. 8 is a plane diagram of one side of the first flexible substrate in the according to the present invention.

Furthermore, as shown in FIG. 8, gate lines 101, data lines 102, TFTs 103 and ITO pixel electrodes 104 are located at the inner side of the first flexible substrate 1, which are equivalent to a TFT substrate of the present liquid crystal panel.

Figure 9:
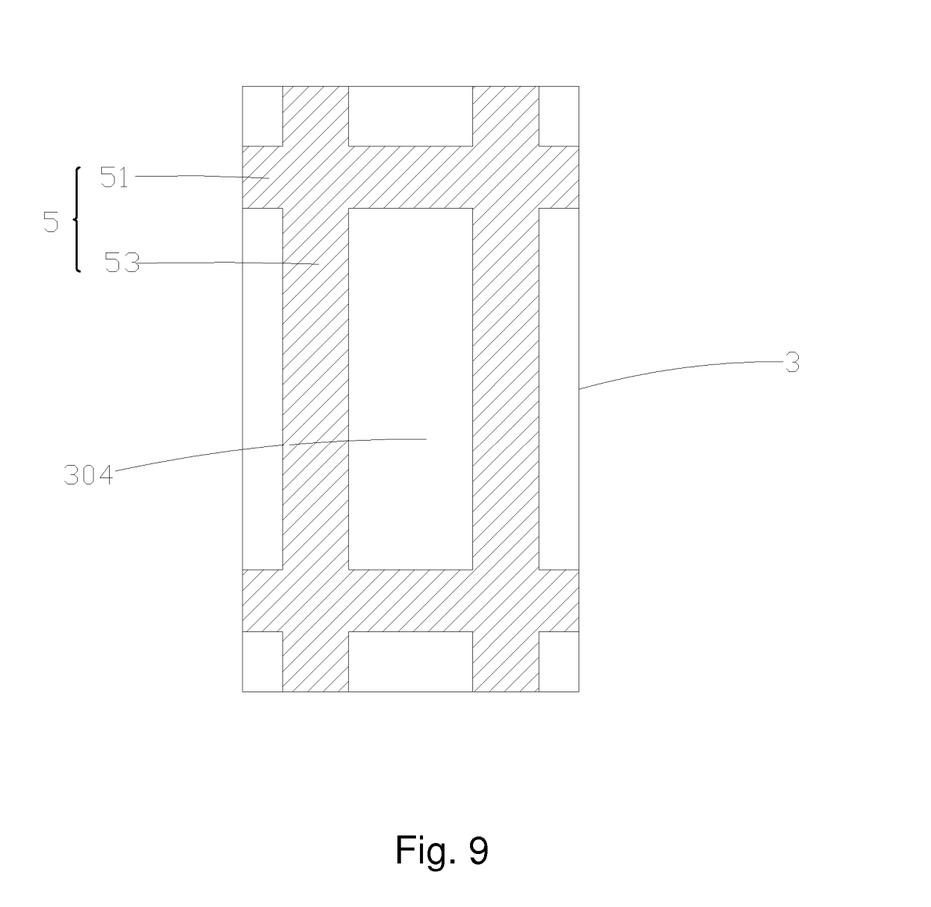
FIG. 9 is a plane diagram of one side of the second flexible substrate in the according to the present invention.

As shown in FIG. 9, an ITO common electrode 304 is located at the inner side of the second flexible substrate 3, which is equivalent to a CF substrate in the present liquid crystal panel.

The liquid crystal layer 9 is filled in closed districts formed by the transverse parts 51 and the longitudinal parts 53 of the spacing retaining wall 5 interlacing with one another, and the seal glue 7 is coated at a side of the spacing retaining wall 5 close to the first flexible substrate 1 to bond the first and the second flexible substrates 1, 3 together, and block the flow of the liquid crystals in the panel for stably supporting the cell gap between the first and the second flexible substrates 1, 3. Thus, the evenness of the cell gap in a liquid crystal layer of a bent liquid crystal panel can be well maintained for being adaptable for flexible display. Besides, seal frame is generally employed in the traditional liquid crystal panel for adhering the upper, lower substrates. The liquid crystal panel of the present invention is different from the traditional liquid crystal panel. No seal frame is set but the seal glue 7 is employed for adhering the first flexible substrate 1 and the second flexible substrate 3. Without the seal glue 7, the first flexible substrate 1 and the second flexible substrate 3 cannot be bonded.

Significantly, the seal glue 7 is UV curing and heat curing complex glue, and is cured by a complex way of UV curing and heat curing. In the compositions, at least one prepolymer comprises acrylate group of UV curing and epoxy group of heat curing. After the seal glue 7 is cured by a complex way of UV curing and heat curing, the first flexible substrate 1 and the second flexible substrate 3 can be bonded together, tightly and firmly. The seal glue 7 is coated on a side of the spacing retaining wall 5 close to the first flexible substrate 1 and directly attached to the spacing retaining wall 5, which is easy for manufacture and can co-work with the spacing retaining wall 5 for blocking the flow of the liquid crystals in the panel.

Figure 10:
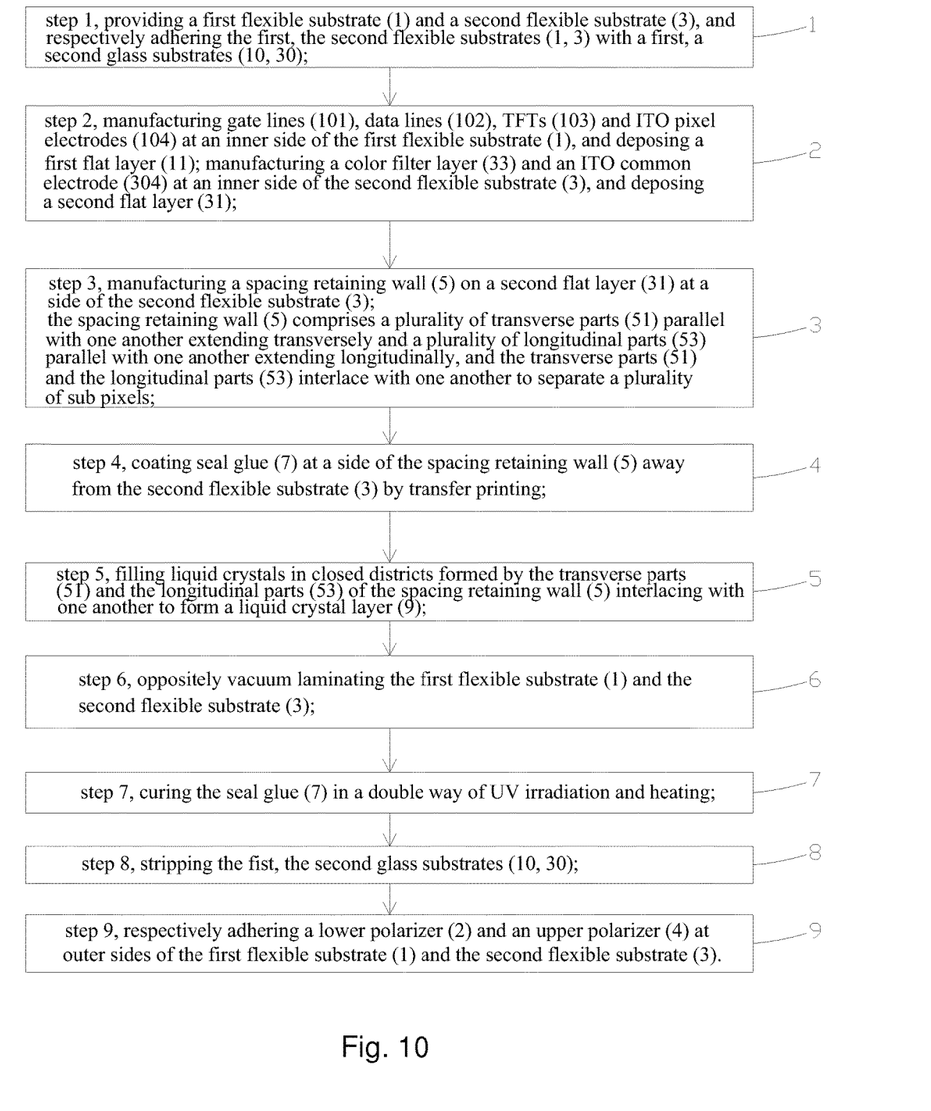
FIG. 10 is a flowchart of a manufacture method of the flexible liquid crystal panel according to the present invention.
Figure 11:
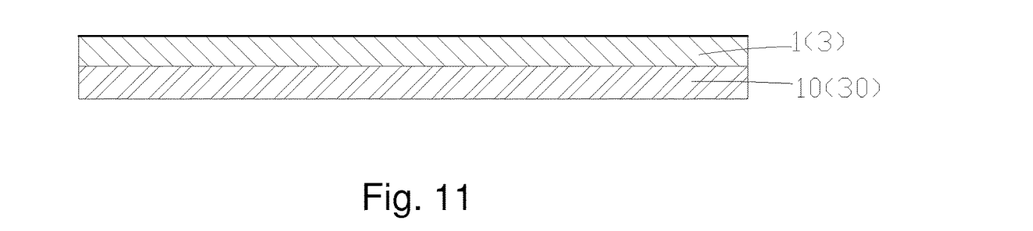
FIG. 11 is a diagram of step 1 in the manufacture method of the flexible liquid crystal panel according to the present invention.

Please refer to FIG. 10, the present invention further provides a manufacture method of a flexible liquid crystal panel, comprising steps of:

step 1, referring to FIG. 11, providing a first flexible substrate 1 and a second flexible substrate 3, and respectively adhering the first, the second flexible substrates 1, 3 with a first, a second glass substrates 10, 30.

Both the first flexible substrate 1 and the second flexible substrate 3 are transparent and flexible. Specifically, both the first flexible substrate 1 and the second flexible substrate 3 are plastic substrates, and preferably, the first flexible substrate 1 and the second flexible substrate 3 are PI substrates or PET substrates.

Figure 12:
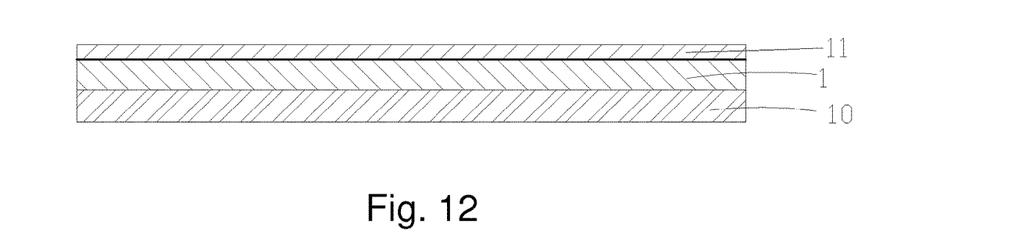
FIGS. 12, 13 are diagrams of the step 2 in the manufacture method of the flexible liquid crystal panel according to the present invention.

With adhering the first, the second flexible substrates 1, 3 with a first, a second glass substrates 10, 30, the first, the second flexible substrates 1, 3 can be throughout in plane state under high temperature conditions of the following steps.

step 2, referring to FIG. 12 with FIG. 8, manufacturing gate lines 101, data lines 102, TFTs 103 and ITO pixel electrodes 104 at an inner side of the first flexible substrate 1, and deposing a first flat layer 11.

Figure 13:
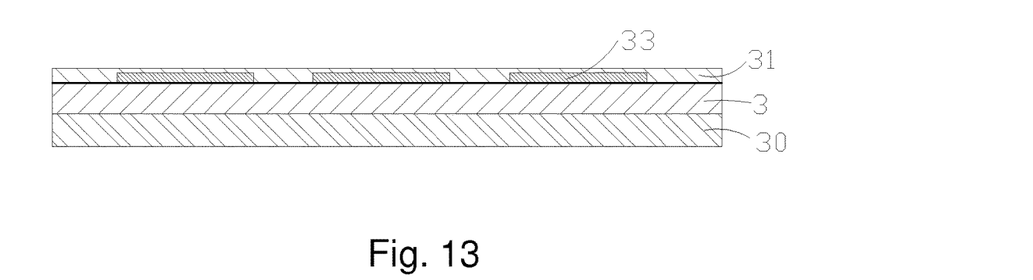
Figure 14:
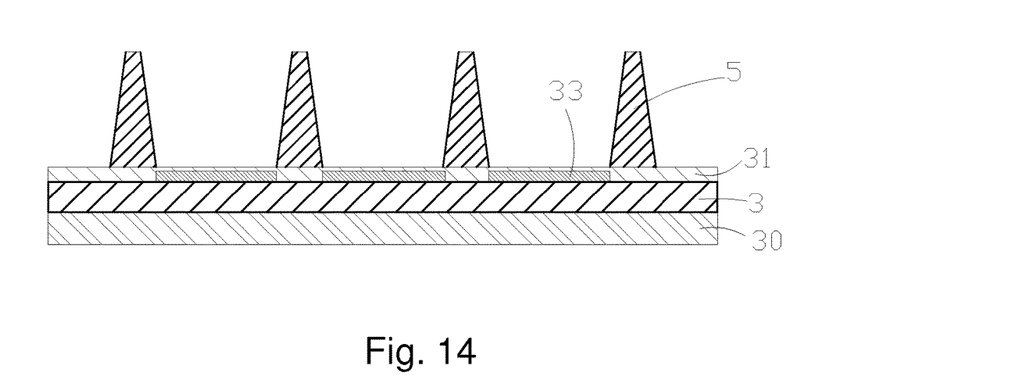
FIG. 14 is a diagram of step 3 in the manufacture method of the flexible liquid crystal panel according to the present invention.

Please refer to FIG. 13 with FIG. 9, manufacturing a color filter layer 33 and an ITO common electrode 304 at an inner side of the second flexible substrate 3, and deposing a second flat layer 31.

step 3, referring to FIG. 13 with FIG. 6, manufacturing a spacing retaining wall 5 on a second flat layer 31 at a side of the second flexible substrate 3 by photo process.

Figure 15:
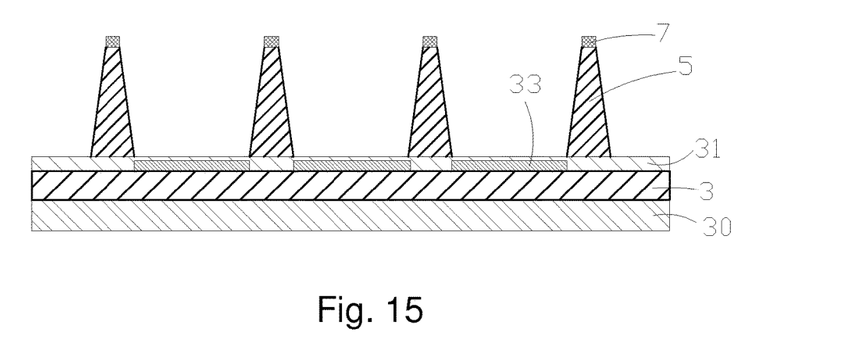
FIG. 15 is a diagram of step 4 in the manufacture method of the flexible liquid crystal panel according to the present invention.

The spacing retaining wall 5 comprises a plurality of transverse parts 51 parallel with one another extending transversely and a plurality of longitudinal parts 53 parallel with one another extending longitudinally, and the transverse parts 51 and the longitudinal parts 53 interlace with one another to separate a plurality of sub pixels.

step 4, referring to FIG. 15, coating seal glue 7 at a side of the spacing retaining wall 5 away from the second flexible substrate 3 by transfer printing.

The seal glue 7 is UV curing and heat curing complex glue, and is cured by a complex way of UV curing and heat curing. The compositions of the seal glue 7 are prepolymer resin, viscosity modifier, photoinitiator, heat curing agent and filler.

Specifically, a ratio of total weight of the prepolymer resin is 10%-60%, and the prepolymer resin comprises one or many of prepolymer resins having polymerizable group (such as: acrylate group, methacrylate group, epoxy group), wherein the at least one prepolymer resin comprises acrylate group of UV curing and epoxy group of heat curing. It can be but not restricted to be:

n is an integer of 0-10.

Figure 16:
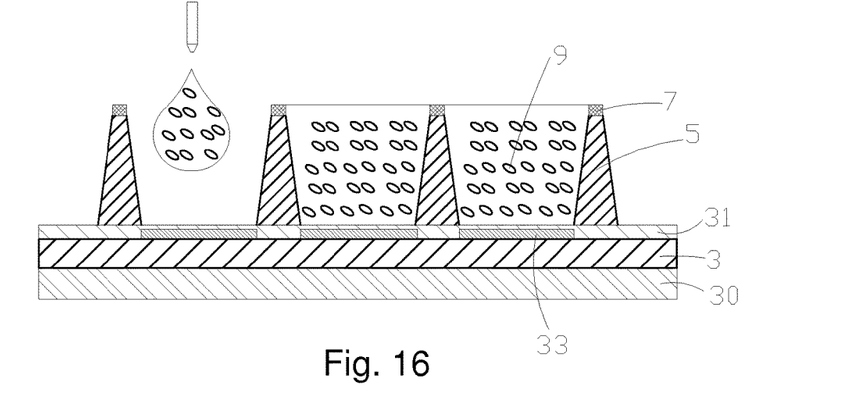
FIG. 16 is a diagram of step 5 in the manufacture method of the flexible liquid crystal panel according to the present invention.
Figure 17:
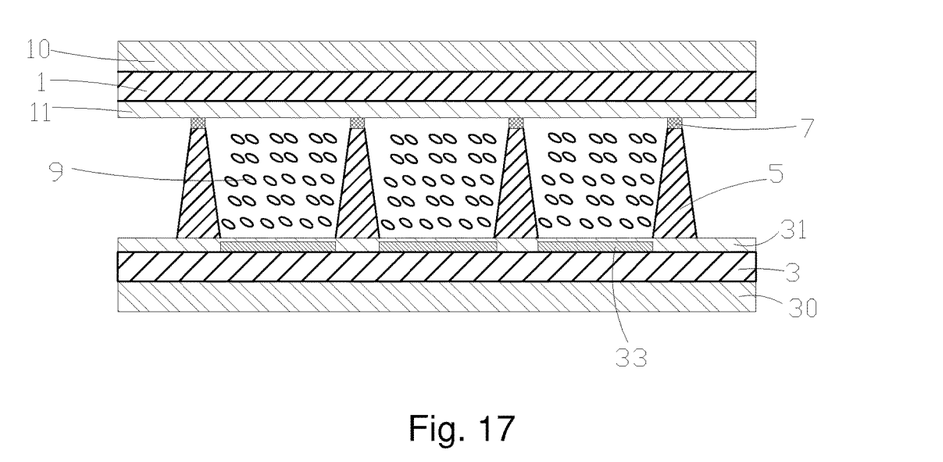
FIG. 17 is a diagram of the step 6 in the manufacture method of the flexible liquid crystal panel according to the present invention.
Figure 18:
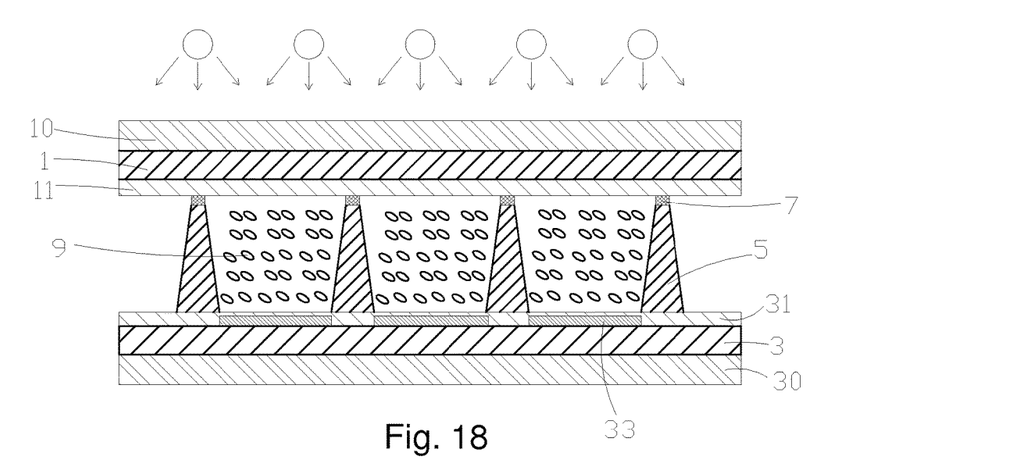
FIGS. 18, 19 are diagrams of the step 7 in the manufacture method of the flexible liquid crystal panel according to the present invention.
Figure 19:
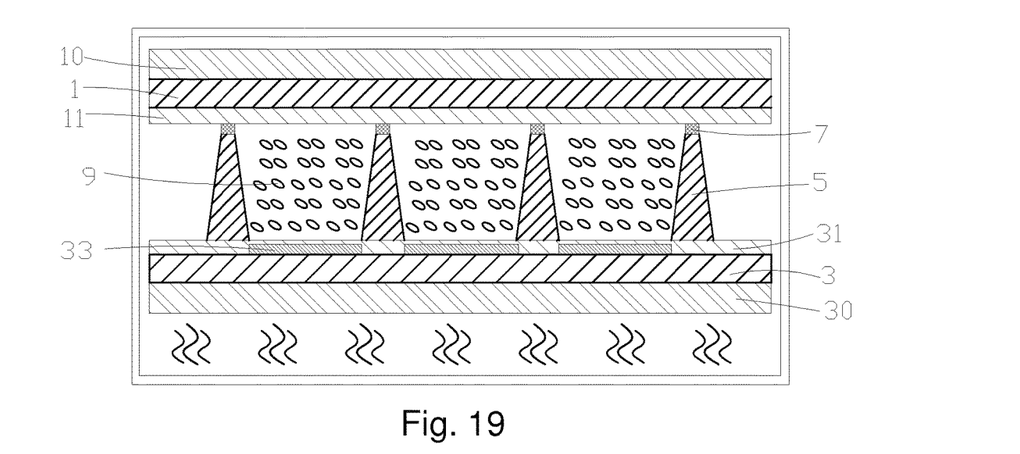
Figure 20:
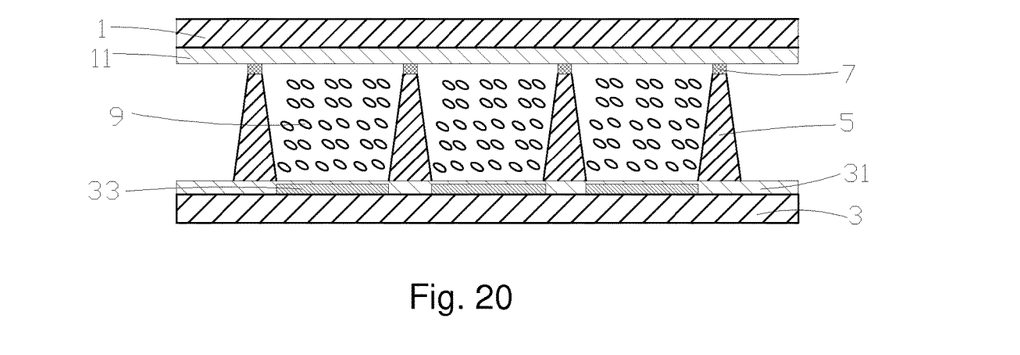
FIG. 20 is a diagram of the step 8 of a manufacture method of a flexible liquid crystal panel according to the present invention.

A ratio of total weight of the viscosity modifier is 5%-30%, and the viscosity modifier is reactive monomer having polymerizable group which the molecular weight is smaller and the viscosity is lower. It can be but not restricted to be:

A ratio of total weight of the photoinitiator is 0.05%-1%, and the photoinitiator can be a CIBA IRGACURE series of photoinitiator, such as CIBA IRGACURE651, and the structure is below:

A ratio of total weight of the heat curing agent is 10%-40%, and the heat curing agent is a compound of Anhydride series or Amine series. It can be but not restricted to be:

A ratio of total weight of the filler is 5%-20%, and the filler is inorganic granular substance selected from silicon dioxide, aluminum oxide, zinc oxide, titanium oxide, magnesium oxide, calcium sulfate, aluminum nitride or silicon nitride.

step 5, referring to FIG. 16, filling liquid crystals in closed districts formed by the transverse parts 51 and the longitudinal parts 53 of the spacing retaining wall 5 interlacing with one another to form a liquid crystal layer 9 by spraying;

step 6, referring to FIG. 17, oppositely vacuum laminating the first flexible substrate 1 and the second flexible substrate 3.

step 7, referring to FIG. 18, FIG. 19, curing the seal glue 7 in a double way of UV irradiation and heating to realize a better curing result, and bonding the first flexible substrate 1 and the second flexible substrate 3 together, more firmly and more tightly for achieving the package of the first flexible substrate 1 and the second flexible substrate 3 to the liquid crystal layer 9 better.

step 8, referring to FIG. 20, stripping the fist, the second glass substrates 10, 30.

step 9, referring to FIG. 5, respectively adhering a lower polarizer 2 and an upper polarizer 4 at outer sides of the first flexible substrate 1 and the second flexible substrate 3.

Thus, the manufacture of the flexible liquid crystal panel is accomplished. In the aforesaid manufacture method of the flexible liquid crystal panel, the spacing retaining wall 5 is manufactured by photo process and the seal glue 7 is coated at a side of the spacing retaining wall 5 away from the second flexible substrate 3 by transfer printing. The liquid crystal layer 9 is filled in closed districts formed by the transverse parts 51 and the longitudinal parts 53 of the spacing retaining wall 5 interlacing with one another. Thus, the issue of the uneven cell gap in a liquid crystal layer of a bent liquid crystal panel according to prior art is eliminated to allow the liquid crystal panel adaptable for flexible display.

In conclusion, in the flexible liquid crystal panel of the present invention, by locating the spacing retaining wall at a side of the second flexible substrate, and coating the seal glue at a side of the spacing retaining wall close to the first flexible substrate to bond the first and the second flexible substrates together for stably supporting the cell gap between the two substrates, and firmly blocking the flow of the liquid crystals in the panel, the evenness of the cell gap in a liquid crystal layer of a bent liquid crystal panel can be well maintained for being adaptable for flexible display. In the manufacture method of the flexible liquid crystal panel according to the present invention, the spacing retaining wall is manufactured by photo process and the seal glue is coated at a side of the spacing retaining wall away from the second flexible substrate by transfer printing. Thus, the issue of the uneven cell gap in a liquid crystal layer of a bent liquid crystal panel according to prior art is eliminated to allow the liquid crystal panel adaptable for flexible display.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A manufacture method of a flexible liquid crystal panel, comprising steps of:
    step 1, providing a first flexible substrate and a second flexible substrate, and respectively adhering the first, the second flexible substrates with a first, a second glass substrates;
    step 2, manufacturing gate lines, data lines, TFTs and ITO pixel electrodes at an inner side of the first flexible substrate, and deposing a first flat layer;
    manufacturing a color filter layer and an ITO common electrode at an inner side of the second flexible substrate, and deposing a second flat layer;
    step 3, manufacturing a spacing retaining wall on a second flat layer at a side of the second flexible substrate;
    wherein the spacing retaining wall comprises a plurality of transverse parts parallel with one another extending transversely and a plurality of longitudinal parts parallel with one another extending longitudinally, and the transverse parts and the longitudinal parts interlace with one another to separate a plurality of sub pixels, the spacing retaining wall being formed through a photo process such that each of the plurality of longitudinal parts and the plurality of transverse parts comprises two opposite inclined side surfaces that are converging from a proximal side thereof located on the second flat layer of the second flexible substrate toward a distal side distant from the second flat layer of the second flexible substrate;
    step 4, coating seal glue at the distal side of the spacing retaining wall away from the second flexible substrate, wherein the seal glue is a complex glue having a composition comprising a heat curable agent and a UV curable agent;
    step 5, filling liquid crystals in closed districts formed by the transverse parts and the longitudinal parts of the spacing retaining wall interlacing with one another to form a liquid crystal layer;
    step 6, oppositely vacuum laminating the first flexible substrate and the second flexible substrate;
    step 7, curing the seal glue in a double way of UV irradiation and heating to have the heat curable agent and the UV curable agent cured simultaneously; and
    step 8, stripping the first and second glass substrates;
    wherein the seal glue is coated by transfer printing; the liquid crystals are injected to form the liquid crystal layer by spraying;
    the compositions of the seal glue are prepolymer resin, viscosity modifier, photoinitiator, heat curing agent and filler;
    a ratio of total weight of the prepolymer resin is 10%-60%, and the prepolymer resin comprises one of prepolymer resins having polymerizable group, wherein the at least one prepolymer resin comprises acrylate group of UV curing and epoxy group of heat curing;
    a ratio of total weight of the viscosity modifier is 5%-30%, and the viscosity modifier is reactive monomer having polymerizable group which the molecular weight is smaller and the viscosity is lower;
    a ratio of total weight of the photoinitiator is 0.05%-1%;
    a ratio of total weight of the heat curing agent is 10%-40%, and the heat curing agent is a compound of Anhydride series or Amine series; and
    a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

2. The manufacture method of the flexible liquid crystal panel according to claim 1, further comprising step 9, in which a lower polarizer and an upper polarizer are respectively adhered to outer sides of the first flexible substrate and the second flexible substrate.

3. The manufacture method of the flexible liquid crystal panel according to claim 1, wherein both the first flexible substrate and the second flexible substrate are plastic substrates.

4. A manufacture method of a flexible liquid crystal panel, comprising steps of:
    step 1, providing a first flexible substrate and a second flexible substrate, and respectively adhering the first, the second flexible substrates with a first, a second glass substrates;
    step 2, manufacturing gate lines, data lines, TFTs and ITO pixel electrodes at an inner side of the first flexible substrate, and deposing a first flat layer;
    manufacturing a color filter layer and an ITO common electrode at an inner side of the second flexible substrate, and deposing a second flat layer;
    step 3, manufacturing a spacing retaining wall on a second flat layer at a side of the second flexible substrate;
    wherein the spacing retaining wall comprises a plurality of transverse parts parallel with one another extending transversely and a plurality of longitudinal parts parallel with one another extending longitudinally, and the transverse parts and the longitudinal parts interlace with one another to separate a plurality of sub pixels, the spacing retaining wall being formed through a photo process such that each of the plurality of longitudinal parts and the plurality of transverse parts comprises two opposite inclined side surfaces that are converging from a proximal side thereof located on the second flat layer of the second flexible substrate toward a distal side distant from the second flat layer of the second flexible substrate;
    step 4, coating seal glue at the distal side of the spacing retaining wall away from the second flexible substrate, wherein the seal glue is a complex glue having a composition comprising a heat curable agent and a UV curable agent;
    step 5, filling liquid crystals in closed districts formed by the transverse parts and the longitudinal parts of the spacing retaining wall interlacing with one another to form a liquid crystal layer;
    step 6, oppositely vacuum laminating the first flexible substrate and the second flexible substrate;

step 7, curing the seal glue in a double way of UV irradiation and heating to have the heat curable agent and the UV curable agent cured simultaneously; and step 8, stripping the first and second glass substrates;

wherein the manufacture method of the flexible liquid crystal panel further comprises step 9, in which a lower polarizer and an upper polarizer are respectively adhered to outer sides of the first flexible substrate and the second flexible substrate;

wherein both the first flexible substrate and the second flexible substrate are plastic substrates; and wherein the seal glue is coated by transfer printing; the liquid crystals are injected to form the liquid crystal layer by spraying;

the compositions of the seal glue are prepolymer resin, viscosity modifier, photoinitiator, heat curing agent and filler;

a ratio of total weight of the prepolymer resin is 10%-60%, and the prepolymer resin comprises one of prepolymer resins having polymerizable group, wherein the at least one prepolymer resin comprises acrylate group of UV curing and epoxy group of heat curing;

a ratio of total weight of the viscosity modifier is 5%-30%, and the viscosity modifier is reactive monomer having polymerizable group which the molecular weight is smaller and the viscosity is lower;

a ratio of total weight of the photoinitiator is 0.05%-1%;

a ratio of total weight of the heat curing agent is 10%-40%, and the heat curing agent is a compound of Anhydride series or Amine series; and a ratio of total weight of the filler is 5%-20%, and the filler is inorganic granular substance of silicon dioxide, aluminum oxide, zinc oxide, titanium oxide, magnesium oxide, calcium sulfate, aluminum nitride or silicon nitride.

\* \* \* \* \*